United States Patent
Majid

(10) Patent No.: US 9,681,183 B1
(45) Date of Patent: Jun. 13, 2017

(54) OVER-THE-AIR DIGITAL TELEVISION VIDEO STREAM TUNING AND CASTING

(71) Applicant: BBY SOLUTIONS, INC., Richfield, MN (US)

(72) Inventor: Mahmood Majid, Lakeville, MN (US)

(73) Assignee: BBY SOLUTIONS, INC., Richfield, MN (US)

(*) Notice: Subject to any disclaimer, the term of this patent is extended or adjusted under 35 U.S.C. 154(b) by 0 days.

(21) Appl. No.: 15/159,742

(22) Filed: May 19, 2016

(51) Int. Cl.
| | |
|---|---|
| H04N 7/01 | (2006.01) |
| H04N 5/44 | (2011.01) |
| H04N 21/4402 | (2011.01) |
| H04N 21/4363 | (2011.01) |
| H04N 21/426 | (2011.01) |
| H04N 21/61 | (2011.01) |

(Continued)

(52) U.S. Cl.
CPC . H04N 21/440218 (2013.01); H04N 21/2221 (2013.01); H04N 21/4122 (2013.01); H04N 21/4263 (2013.01); H04N 21/4382 (2013.01); H04N 21/4398 (2013.01); H04N 21/43615 (2013.01); H04N 21/43635 (2013.01); H04N 21/43637 (2013.01); H04N 21/6112 (2013.01)

(58) Field of Classification Search
CPC ....... H04N 21/440218; H04N 21/2221; H04N 21/4122; H04N 21/4263; H04N 21/43615; H04N 21/43635; H04N 21/43637; H04N 21/4382; H04N 21/4398; H04N 21/6112; H04N 7/01; H04N 5/4401
USPC .... 348/441, 725, 731, 738; 725/68, 85, 100, 725/131, 139, 151
IPC .............................................. H04N 5/44,7/01
See application file for complete search history.

(56) References Cited

U.S. PATENT DOCUMENTS 8,126,318 B2 * 2/2012 Nonaka .............. G11B 20/1262
386/314
2004/0004630 A1 1/2004 Kalva
(Continued)

FOREIGN PATENT DOCUMENTS

EP 2584800 B1 11/2004

OTHER PUBLICATIONS

"Have You thought about cutting the cord and forgetting about cable TV? Make HDHomeRun Connect part of your home network.", HD Home Run Connect, (Feb. 2016), 4 pgs.
(Continued)

Primary Examiner — Sherrie Hsia
(74) Attorney, Agent, or Firm — Schwegman Lundberg & Woessner, P.A.

(57) ABSTRACT

A display device and display techniques for receiving a digital television signal, outputting the digital television signal on a display screen, transcoding the digital television signal to a streamable format, and casting the transcoded digital television signal via a communication network to a remote device are described herein. In an example, the processing circuitry of a television device may be configured to convert digital audiovisual content to another format and transmit the digital audiovisual content to a secondary display device using a built-in Wi-Fi chipset, such as to enable screen mirroring, place-shifting, or portability of the audiovisual content. In a further example, the processing circuitry of a television device may be configured to convert digital audiovisual content to another format and transmit the digital audiovisual content to a secondary streaming device, such as a media server, to allow subsequent playback.

22 Claims, 7 Drawing Sheets

(51) Int. Cl.
| | |
|---|---|
| *H04N 21/439* | (2011.01) |
| *H04N 21/41* | (2011.01) |
| *H04N 21/436* | (2011.01) |
| *H04N 21/438* | (2011.01) |
| *H04N 21/222* | (2011.01) |

(56) References Cited

U.S. PATENT DOCUMENTS

| | | |
|---|---|---|
| 2006/0031889 A1* | 2/2006 | Bennett ............ H04L 29/06027 725/80 |
| 2006/0117371 A1 | 6/2006 | Margulis |
| 2007/0250872 A1 | 10/2007 | Dua |
| 2009/0199256 A1 | 8/2009 | White et al. |
| 2014/0282699 A1 | 9/2014 | Fertig et al. |

OTHER PUBLICATIONS

"Have you thought about cutting the cord and forgetting about cable TV? Make HDHorneRun Extend part of your home network.", HomeRun Extend, (Feb. 2016), 4 pgs.

"How Tablo Works", [Online]. Retrieved from the Internet: <URL: https://www.tablotv.com/howtabloworks/, (2016), 7 pgs.

"Slingbox User Guide—Your auide to setting up and using the Slingbox", (2005), 1-88.

Zatz, Dave, "AirTV Streams Local Channels Directly Into Sling TV", [Online]. Retrieved from the Internet: <URL: http://zatznotfunny.com/201604/ airtvslingtv/, (Apr. 15, 2016), 3 pgs.

* cited by examiner

OVER-THE-AIR DIGITAL TELEVISION VIDEO STREAM TUNING AND CASTING

TECHNICAL FIELD

The present disclosure pertains to the operation and configuration of electronic display devices. Some examples relate to the display, processing, and communication of digital television signals among consumer electronic display devices, such as televisions, monitors, smartphones, tablets, and the like.

BACKGROUND

Electronic display devices such as televisions, set top boxes, video receivers, and projectors often contain internal television tuners for receipt of digital terrestrial, cable, or satellite television signals. One form of digital terrestrial television signals that is commonly deployed in North America is in the ATSC format, which provides broadcasts of high-definition and standard definition digital television signals using MPEG-2 video coding and AC-3 audio coding. Another form of digital television signals that are commonly deployed in North America is in the Quadrature Amplitude Modulation (QAM) format, such as 64-QAM and 256-QAM formats (respectively referring to different modulation forma(s) used in digital cable systems that are decoded by QAM tuners. Electronic display devices often provide the basic capability of outputting a display from an internal tuner or from a set-top box directly on a display screen of the device, and do not include functionality to permit place-shifting, time-shifting, or other forms of remote viewing.

DETAILED DESCRIPTION

Figure 1:
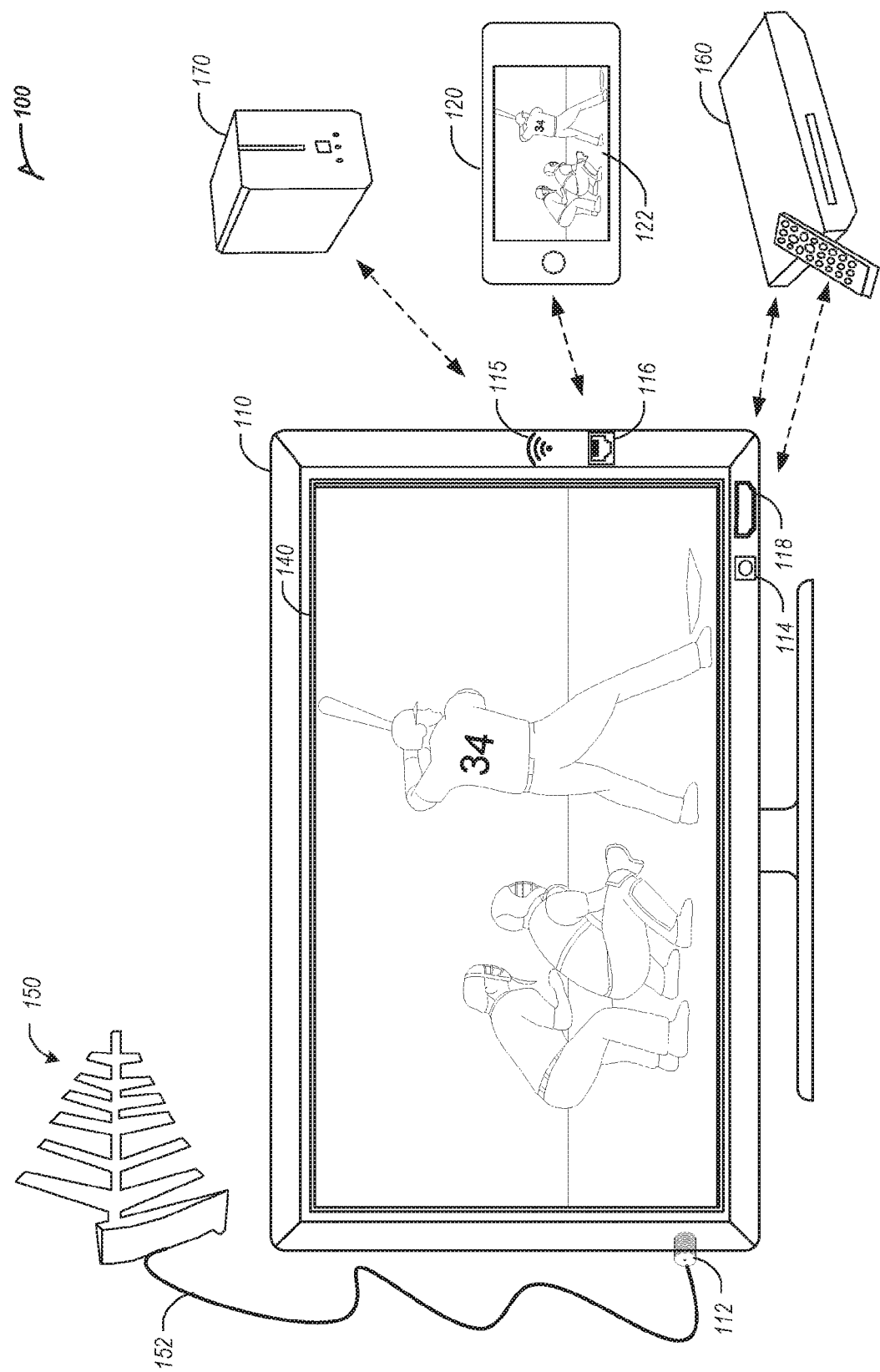
FIG. 1 illustrates a scenario of operation of an electronic display system, adapted for the display and casting of digital television content among multiple devices, in connection with an example further described herein.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Traditionally, in the United States, television broadcasts were performed using an analog National Television System Committee (NTSC) signal. In 2009, standards throughout the United States were changed to an Advanced Television Systems Committee (ATSC) digital terrestrial television signal, also known as an over-the-air (OTA) digital television signal. Other countries use other various digital signal standards to communicate digital terrestrial television signals, such as the Digital Video Broadcasting-Terrestrial (DVB-T) standard throughout Europe and most of Asia, the Integrated Services Digital Broadcasting-Terrestrial (ISDB-T) standard in most of South America, and the Digital Terrestrial Multimedia Broadcast (DTMB) standard in China. Cable television in the United States is typically broadcast using a quadrature amplitude modulation (QAM) format. Each of these examples of digital television signals may be used with the presently described use of a tuner, provided that the tuner is configured to interpret the type of signal received.

Some of the examples described herein relate to an electronic device configured to perform tuning of a digital television signal and casting of this digital television signal to one or more secondary devices, directly from internal circuitry of the electronic device. In an example, the reception of over-the-air digital television content, received at a television or television signal receiver, is transcoded and rebroadcast to a secondary devices such as a tablet, smartphone, or other mobile devices. Such digital television content may be transmitted wirelessly on other mobile devices via a home wireless local area network (e.g., a Wi-Fi Network) within range, or remotely via a wide area network connection.

In an example, a television device receives a digital television content signal from an indoor or outdoor TV antenna, and uses the internal tuner of the television device to demodulate and decode the signal into an ATSC transport stream that can be outputted to the display screen of the television device. This ATSC transport stream then is converted and transcoded to a network-streamable format (such as a H.264 H.265 stream) that is suitable for transmission over an IP network for place-shifted distribution to remote devices. For example, the transcoded content may be casted to the mobile devices in proximity to the television device using a wireless or wired LAN, such as with a Wi-Fi wireless network that is accessible inside a home or local location of the mobile device user.

In a further example, the digital television content may be transcoded and casted to a media server, such as a network attached server, storage unit, or the like, for time-shifted distribution to remote devices. The content that may be casted from a television device may include a variety of content types (e.g., unencrypted content) for distribution via a media server, such as home videos, screen shots, photos, movies, social content, and the like that are displayed or accessible to a television, monitor, or like display device.

Thus, the examples discussed herein enable the rebroadcast and retransmission of a variety of content types to a secondary display device (e.g., a smartphone or tablet), to enable mirroring of the digital audiovisual content displayable on the primary display device (e.g., a television or monitor). The present techniques further enable digital audiovisual content to be converted within the circuitry of the primary display device, and then transmitted for display to a secondary display device, via a network connection established using the network communication functions of the primary display device. Thus, such techniques may be used with "smart" tuner-less display monitors devices that do not include a tuner but include a network interface for a Wi-Fi or Ethernet network connection, provided that the display monitor can receive or transmit television content via the network interface.

Further, the examples discussed herein enable digital audiovisual content to be transcoded into network-optimized streams (e.g., using VP8/H.264/H.265 video codecs), and stored on a media server for a time-delayed (or real-time) streaming to a mobile device. This media server may serve as an uplink to receive content from one or multiple sources, and to allow delayed or time-modified distribution of live television content. The use of a media server also may be extended to allow other features of remote playback and content enhancements, such as multiple stream outputs, picture-in-picture streams, overlays of social content, and the like.

Existing display devices such as televisions either include a tuner built in to the device (such as in the case of televisions), or attached as an external tuner to the device (such as in the case of display monitors). The present techniques and device configurations enable portable casting of digital content directly from a television or other display device, even while displaying and processing the content simultaneously on the television.

FIG. 1 provides an illustration of an example system 100 adapted for the display and casting of digital television content among multiple devices, with the use of a television display device 110. As shown, the system 100 includes a series of electronic devices that are communicatively coupled to the television display device 110, including a secondary display device 120 (e.g., a smartphone), a media player 160 (e.g., a DVD or Blu-Ray player), and a network server 170 (e.g., a network attached storage (NAS) device). The system 100 further includes an antenna 150 that is coupled to an antenna port 112 of the television display device 110 via an antenna cable 152.

In the configuration of the system 100, the television display device 110 is adapted to receive, process, and output digital television content that is received from the antenna 150 via the antenna port 112 to the display screen 140. The digital television content may be tuned, decoded, and demodulated using a tuner module (not shown) included within the internal circuitry of the television display device 110. Further, the television display device 110 may receive digital television content from other external sources, such as digital audiovisual content via a High-Definition Multimedia Interface (HDMI) port 118 that is connected to the media player 160 or other external device. Further, the HDMI port 118 may send and receive a device control command (e.g., a Consumer Electronics Control (CEC) command) and may support Mobile High-Definition Link (MHL) features via the HDMI port 118. For example, a MHL-compliant connector may be used by an external device (such as a dongle-form streaming media player) to obtain power via the HDMI port 118.

The television display device 110 may expose other input and output ports (e.g., SD memory card port, USB ports, additional HDMI ports) to receive and transmit content and signals. The television display device 110 may include a housing, such as a case or shell made of a material or combination of materials such as metal, plastic, or the like, from which the input and output ports and the display screen 140 are exposed. The housing may be substantially rectangular or may have a unique shape. The television display device 110 may further include a remote control receiver 114 that is exposed from the housing to receive infrared (IR), radio frequency (RF), Bluetooth, or like commands, such as IR commands emitted from a hand-held remote control.

In an example, the television display device 110 is a fully integrated (e.g., connected or "smart") television, operable to execute various software applications and communicate with a network. The television display device 110 is depicted as including a wireless network interface 115 (e.g., IEEE 802.11 wireless network interface) and a wired network interface 116 (e.g., Ethernet network interface) for network connectivity on a local and wide area network. For example, the wireless network interface 115 may be used to establish a connection with a wireless network, such as using a Wi-Fi standard, or directly with another device, such as using Wi-Fi Direct, Bluetooth, or the like. The television display device 110 may receive digital television content via the network interfaces 115, 116, from any number of local or wide area (e.g., Internet) sources. Further, the television display device 110 may access content hosted via the network server 170 (such as personal media content, e.g., photos, movies, digital media copies, and the like). For example, as discussed below, the television display device 110 may replay tuned audiovisual content that is casted to the network server 170.

In an example, the television display device 110 receives a digital terrestrial, cable, or satellite television signal, such as an ATSC digital signal, received via the antenna port 112. The television display device 110 converts the ATSC digital signal into an ATSC transport stream (including MPEG-2 video and AC-3 audio), which is then output to the display screen 140. Concurrently, the television display device 110 transcodes the transport stream to another digital video and digital audio format (such as MPEG-4 Part 10, also known as H.264), and transmits the digital video and digital audio to a secondary device using the network interface (such as the via wireless network interface 115). This content is retransmitted ("casted") directly to a secondary display device, such as the secondary display device 120, or indirectly to a secondary display device via the network server 170. The content then received by the secondary display device 120 may then be output on the display screen 122 of the secondary display device 120. Thus, the television display device 110 may be used to cast digital video and digital audio to one or multiple display devices, such as a desktop computer, laptop, tablet, phone, or the like, using the internal circuitry of the television.

Figure 2:
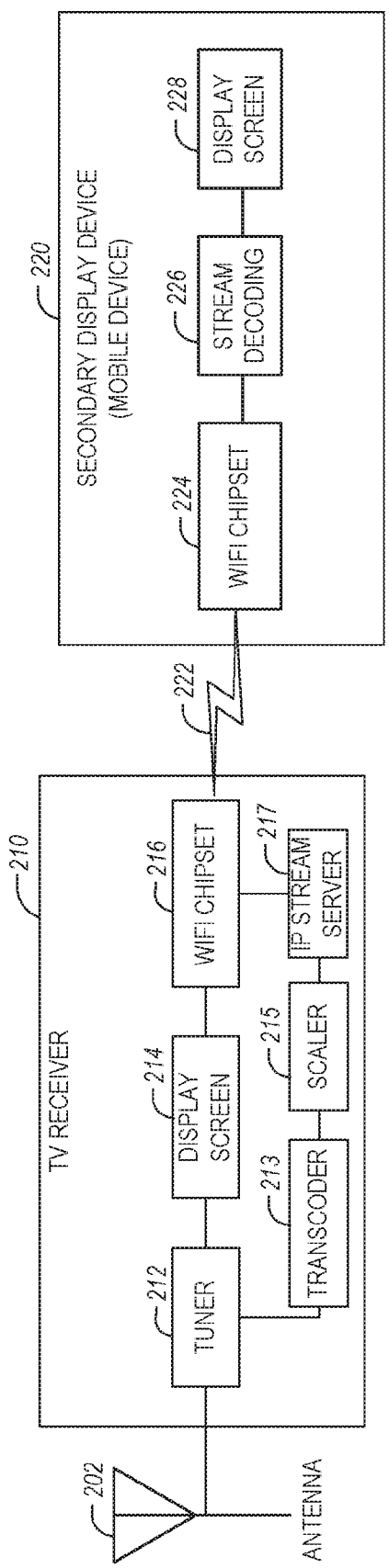
FIG. 2 illustrates a block diagram of a television receiver and paired secondary display, in connection with an example further described herein.

FIG. 2 illustrates a block diagram of a television receiver and paired secondary display, according to an example, to illustrate the presently described use of casting. As shown in FIG. 2, the television receiver 210 includes a tuner 212 that is coupled to an antenna 202 to receive and tune an input digital television signal. The TV receiver 210 further includes a display screen 214, a transcoder 213 to convert the tuned digital audiovisual content from a first format to a second format, a scaler 215 to scale the resolution, format, or other characteristics of the digital audiovisual content, an IP Stream Server 217 to host and stream the audiovisual content to one or more clients through a network connection, and a Wi-Fi chipset 216 (e.g., provided by a wireless networking transceiver) to transmit provide outputs of audiovisual content from the tuned digital television signal.

The IP Stream Server 217 may use HTTP (e.g., HTTP Live Streaming (HLS), DASH), RTP (e.g., Real Time Streaming Protocol (RSTP)), or other network protocols to host, serve, and transmit the respective streams via a network connection. The scaler 215 may operate to convert between an original format received via the tuned digital audiovisual content (e.g., from 1080i or 720p format) to a format compatible with a mobile digital device (e.g., a lower-resolution 480×320 format). The scaler 215 thus may up-convert, down-convert, crop, expand, or modify other features of the video depending on the source and destination screen, network, or processing power characteristics.

In an example, the configuration of FIG. 2 may be used to provide a simultaneous (e.g., real-time or near-real-time, contemporaneous, or synchronized) output of tuned and transcoded audiovisual content on the display screen 214 and to a secondary display device via the IP Stream Server 217 and the Wi-Fi chipset 216. The Wi-Fi chipset 216 may be communicatively coupled to a paired secondary display device 220, via a direct (e.g., peer-to-peer, Wi-Fi Direct) or network-based (e.g., access-point hosted) wireless connection 222 established between the Wi-Fi chipset 216 and the Wi-Fi chipset 224 of the secondary display device 220. In another example, the configuration of FIG. 2 may be used to provide a time-shifted output of tuned and transcoded television content on the display screen 214 and to the paired secondary display device 220, such as through the use of buffering and storage of audiovisual content with the television receiver 210 (e.g., through buffering capabilities of the IP Stream Server 217).

The secondary display device 220 may operate the Wi-Fi chipset 224 to establish a direct or network-based network connection with the television receiver 210, including through a network pairing operation. This network-based connection may involve use of a personal area network, local area network, or wide area network (including use of a cellphone/mobile carrier network). Thus, the streaming capabilities discussed herein my apply to a variety of networks across small or large distances.

The secondary display device 220 may be a phone, tablet, computer, monitor, second television, or the like. The secondary display device 220 may provide commands to the television receiver 210 via the wireless connection 222 to control casting, display, or tuning operations. (For example, the secondary display device 220 may communicate an identifier of a specified channel to the television receiver 210 204 for tuning, and may receive program information or other information of the tuned channel from the television receiver 210). In an example, the Wi-Fi chipsets 216, 224 may be communicatively coupled to an internal or external antenna and transceiver circuitry, and the Wi-FI chipsets 216, 224 may be included within an internal communication chipset (e.g., on a motherboard, daughterboard, or System-On-Chip (SoC)) or external to the respective devices.

The content that is received by the secondary display device 220 may be processed and decoded with a network stream decoder 226, to decode streaming formats encoded with common network-streamed audio and video codecs (e.g., VP8/H.264/VP9/H.265/VP10 video codecs, MP3/Vorbis/AAC/AC3/HE-AAC/Opus audio codecs) that produce video content for output to a display screen 228 and audio component of the secondary display device 220. In a further example, the secondary display device 220 may receive content from the television receiver 210 using an intermediate device (such as a media server, as further illustrated in the configuration of FIG. 3 below).

Figure 3:
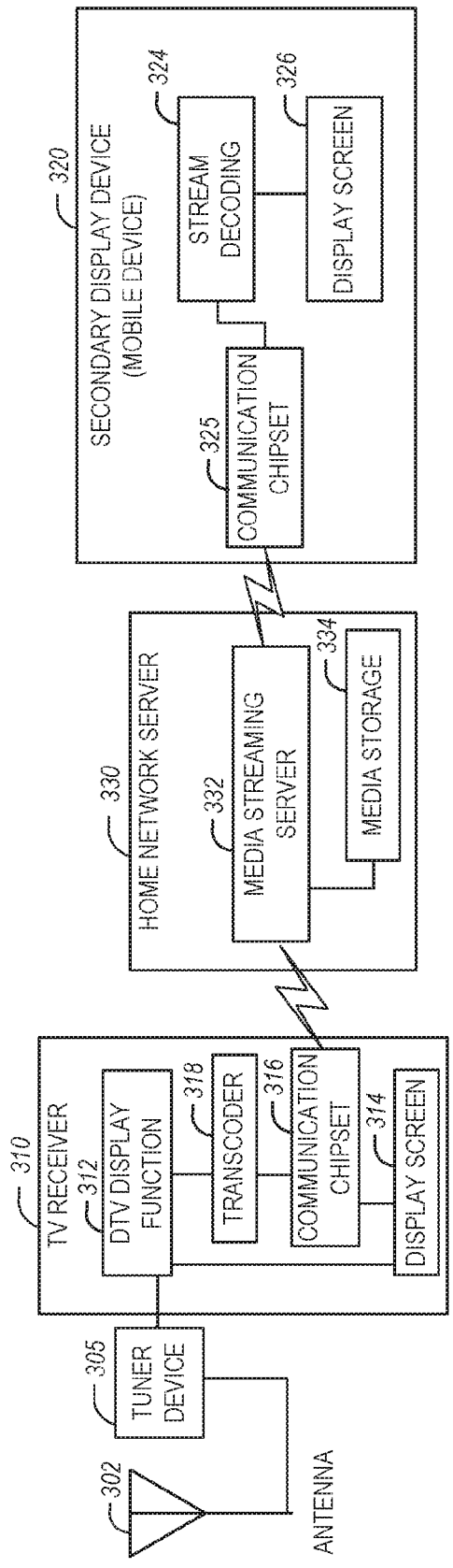
FIG. 3 illustrates a block diagram of a television receiver, home network server, and secondary display device, in connection with an example further described herein.

FIG. 3 illustrates a block diagram of a television receiver 310, home network server 330, and secondary display device 320, to illustrate the use of casting via an intermediate device, according to an example. As shown in FIG. 3, a tuner device 305 may be located external to the television receiver 310, such as the tuner device 305 that is coupled to an antenna 302 to receive a television signal input and provide an output of a decoded ATSC transport stream to a television receiver 310. It will be understood that the features of the tuner device 305 may be integrated within the television receiver, such as is shown in FIG. 2.

The tuner device 305 may output encoded or decoded digital content to the television receiver 310 obtained from the tuned signal. For example, the encoded digital bitstream may be provided in a standard format according to a specification, such as a Moving Picture Experts Group (MPEG) transport stream (MPEG-TS or MPEG-2 transport stream). A MPEG transport stream may also include, in addition to audio or video data, Program and System Information Protocol (PSIP) data. The PSIP data may include ATSC metadata about a channel or channels in the MPEG transport stream, such as a title, description, or the like. The content may include other metadata as well, such as channel information. In the case where the digital content is an encoded bitstream, a decoder on the television receiver 310 may decode and output the digital bitstream.

The television receiver 310 includes a digital television display function 312, a display screen 314, a transcoder 318, and a communication chipset 316. The digital television display function 312 may process and generate an output of the digital audiovisual content from the tuner device 305, such as in response to communicating a tuner command to the tuner device 305. The display screen 314, transcoder 318, and other features of television receiver 310 may be similar to the television receiver 210 of FIG. 2, as the display screen 314 is used to provide the output of the tuned and processed audiovisual content.

The television receiver 310 is shown as being communicatively coupled to a home network server 330 via a network communication established with the communication chipset 316 and a media streaming server function 332 of the home network server 330. The media streaming server 332 may provide communication, processing, and storage functions to persist and serve the audiovisual content to client devices. For example, the media streaming server 332 may be operatively coupled to media storage 334 that includes storage hardware to store and retrieve audiovisual content (e.g., versions of television content that is casted from the television receiver 310 to the home network server 330).

As further shown in FIG. 3, the secondary display device 320 is configured to access media content via the home network server 330, such as is served by the media streaming server 332. The secondary display device 320 may include a communication chipset 325 used to establish a connection with the home network server 330, and an network stream decoder 324 to decode streaming formats encoded with common network-streamed audio and video codecs (e.g., VP8/H.264/VP9/H.265/VP10 video codecs, MP3/Vorbis/AAC/AC3/HE-AAC/Opus audio codecs) and produce video content for output to a display screen 326 and audio output of the secondary display device 320. The secondary display device 320 may also include a processor and memory (not shown) used to implement a user interface to access and control playback of media content for output with the display screen 326. Features of an example user interface are further depicted in FIG. 4.

Figure 4:
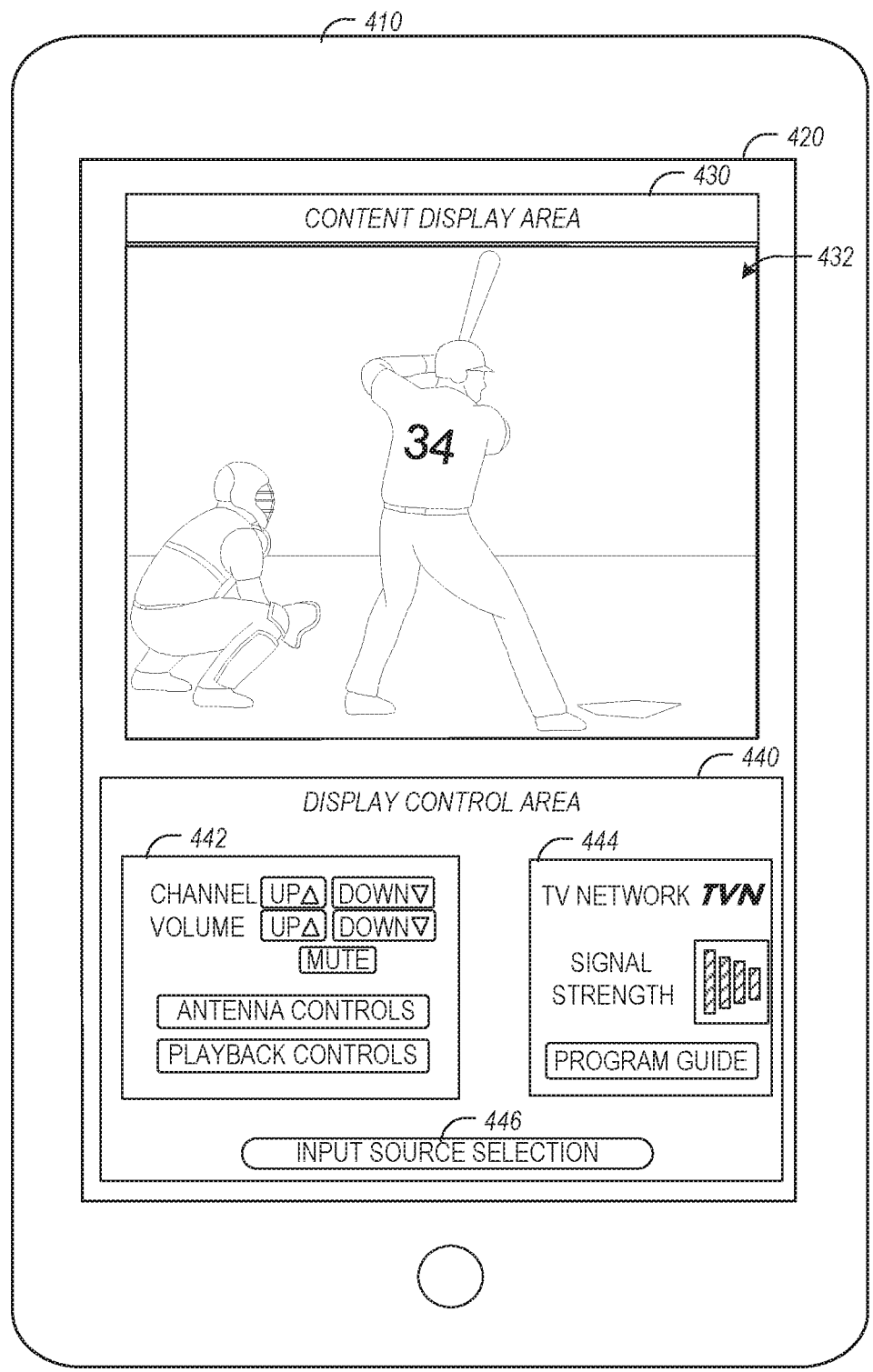
FIG. 4 illustrates a user interface and content output with a secondary display device, in connection with an example further described herein.

FIG. 4 illustrates a user interface and audiovisual content output provided on a secondary display device 410, according to an example. As shown, the display screen 420 of the secondary display device 410 includes a content display area 430 to provide output of audiovisual content 430 (such as streaming video received from a television device), and a display control area 440 to provide control of the audiovisual content being output with the content display area 430.

For example, the content display area 430 may include a display of video, associated video content (e.g., subtitles, closed captioning), and program information (e.g., program guide information). The display control area 440 may include a series of playback controls 442, such as to control the tuned channel (such as with channel up, channel down controls to operate a listing of channels), to control the volume of playback (such as with volume up, volume down, mute controls to operate a speaker or headphone output of the secondary display device 410), to control antenna or source selection, or to control playback (such as with rewind, fast-forward, play, pause controls). The display control area 440 may also include a program display area 444 that can output channel display information for a TV network, signal strength of the tuned television signal, a control to access an electronic program guide, and like features. The display control area 440 may also include an input selection control 446 (allowing selection or switching of one or multiple audiovisual sources). In other examples, the display control area 440 may be provided as an on-screen overlay over the content display area 430. Other variations to the display screen, such as to provide a horizontal or vertically-oriented display, may also be provided on the secondary display device 410.

In an example, the commands that are input with the playback controls 442 may be communicated to the primary display device (e.g., the television serving the content). This may include commands to change the tuner channel of the television, and commands to access or obtain electronic programming guide information. The information that is provided in the program display area 444 may be obtained directly from the primary display device, such as through RF signal strength of a signal directly received with the television tuner, and the transfer of electronic program guide information directly received with the tuner.

In further examples, the user interface may allow a simple content display of content from the primary display device to be mirrored to the secondary display device 410, in response to a command that is initiated on the primary display device (e.g., using the television IR remote control, or using a television control app installed on the mobile device). In a further example, other forms of content from a media player (such as audiovisual content from a UHD 4K blue-ray player) that is received with the primary display device can be provided to the transcoder for casting, such as to convert MPEG digital video to a format such as High Efficiency Video Coding (HEVC, known as H.265). Thus, a variety of playback content may be re-broadcast within an in-home Wi-Fi network to a format that is natively compatible with the secondary device (such as a mobile tablet or smartphone).

In still a further example, the format of the transcoded content may be provided in a reduced resolution or other enhancement for network transfer. Further, the features provided with the playback controls 442 may correspond to functions of the video source, such as the Blu-ray player or other media player. As still another example, a first video source (e.g., a tuner input) received by a television device may be generated and casted for display on one device (e.g., the mobile device 410), while a second video source (e.g., a Blue-ray video source) is being displayed in parallel on another device (e.g., the casting television'). Other variations to video formats, picture-in-picture, multi-channel, and multi-input display also may be deployed.

The user interface depicted in FIG. 4 may also be used for the control of local security cameras or other local video feeds directly connected to the television or local network, through use of the playback controls 442. Such controls may include changing a direction of a camera (e.g., for a camera that includes direction control); turning a camera on or off; adjusting zoom or panning of a camera; or other controls related to accessing pre-stored or live camera content or adjusting camera settings.

In an example, the content display area 430 provides an output on the secondary display device based on a stream decoder and use of appropriate audio and video codecs. For example, the secondary display device may implement video codecs such as MPEG-2 Part 2, MPEG-4 Part 2, H.264, H.265, VP8, VP9, VP10, RealVideo RV40, x265, Theora. Dirac, audio codecs such as MP3, AC3, MPEG-2 Audio (AAC) or MPEG-4 Audio (HE-AAC), Opus, and other variations to lossless and lossy audio and video compression formats.

In a further example, the casting operations or the features available to the mobile device 410 may be location-dependent, such as whether the mobile device 410 is located on a same local network or in the same building (e.g., house) as the casting television, or located remotely. The location of the mobile device 410 may be determined based on GPS, Bluetooth/Wi-Fi positioning data, or like geolocation data of the mobile device that is communicated to the television or a third party service. For example, the television may track the location of the mobile device, so that the television transmits messages or video content to a mobile device for a current or an upcoming television event, including breaking news or sporting updates based on content and location preferences defined by the user. As another example, the television may enable certain features (including features of the mobile application display control area 440) when the location of the mobile device is determined as being inside the user's home, while disabling certain features or offering alternative features when the location of the mobile device is determined as being outside the user's home. Other variations to enable or disable features or content may be based on whether the mobile device is located a certain distance away from the user's primary Wi-Fi network, or connected via a wide-area (e.g., cellphone) network.

Figure 5:
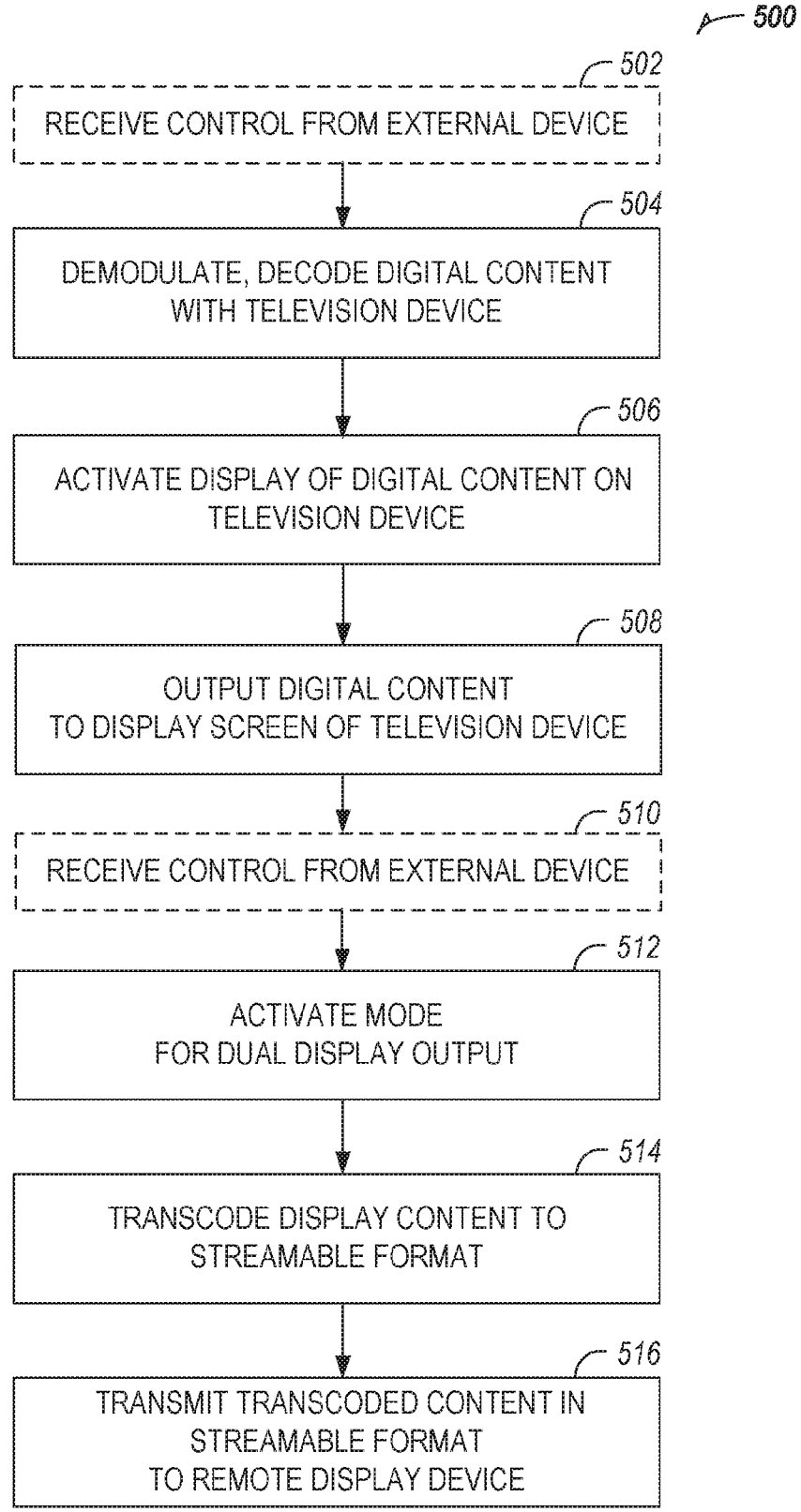
FIG. 5 illustrates a flowchart of a technique to display and cast television content among a television device and a remote display device, in connection with an example further described herein.

FIG. 5 illustrates a flowchart 500 of a technique to display and cast television content among a television device and a remote display device, according to an example. As shown, the flowchart 500 is depicted from the perspective of electronic operations performed on the television device. It will be understood, however, that the electronic operations may be implemented among multiple devices in a display system, including the coordination of activities for activating the respective display triodes and converting the digital content.

The flowchart 500 begins with the receipt of control from an external device (operation 502), such as from a remote control device command, an electronic communication, or other instruction sent to the television device to access digital television content. This command may follow or be accompanied by a command to power on the television device (not shown). The control command is followed by operations that receive, demodulate, and digital television content with the television device (operation 504), such as may be performed by an internal tuner to demodulate and decode ATSC QAM signals within the television device circuitry. The decoded digital television signals may be further processed by a display controller of the television device to activate the display of the digital television content on the display device (operation 506). This is followed by the output (audio and visual output) of the digital television content via the display screen, speakers, or other outputs of the television device (operation 508). This results in an output of the tuned television content directly within a display screen of the television device.

The further operations performed within the flowchart 500 include operations for casting of the tuned television content, such as further processing and transmission techniques to communicate the content to a secondary (e.g., remote) display device. As shown, the further operations include the receipt of control or command from an external device to begin playback in a dual display mode (operation 510). This command is processed to begin activation of a dual display output mode (operation 512), such as may be used for starting casting to a secondary display when also outputting to the display screen of the television device. In addition to the processing of the digital content for display on the television device (such as with operation 506), the television is adapted to convert (e.g., transcode) the display content to a streamable format (operation 514), such as converting video and audio from a first format (e.g., MPEG-2 video) to a second format (e.g., H.264 compressed video). This transcoded content is then provided to the remote display device for output via the remote display device (operation 516).

Figure 6:
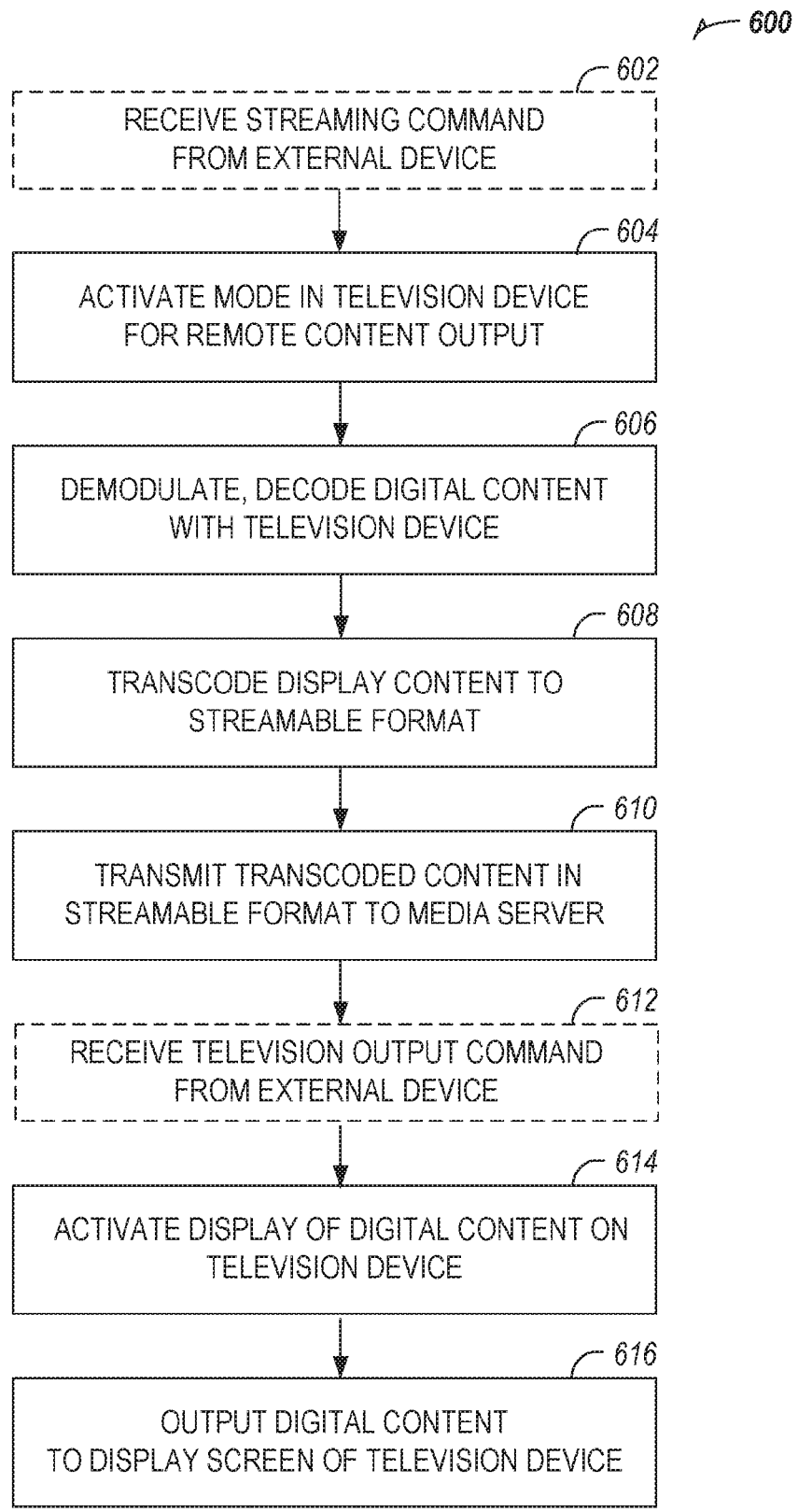
FIG. 6 illustrates a flowchart of another technique to display digital video and digital audio at a remote display device, in connection with an example further described herein.

FIG. 6 provides an illustration of a flowchart 600 of a technique to display digital video and digital audio at a remote display device using a signal tuner device, according to an example. The operations of the flowchart 600 correspond to the features depicted in FIG. 5, but further emphasize the use of a media server as a remote device. It will be understood that the media server may also be used with features of casting as illustrated in FIG. 5, such as in a setting where the media server provides a real-time, concurrent, or simultaneous broadcast of the television content to one or multiple connected devices.

In the flowchart 600, operations for casting to a media server are provided with the use of a streaming command received from an external device (operation 602). This streaming command may be sent directly to the television from a remote control, from the media server, from an external service, or the like. This streaming command is used to activate a mode in the television device to enable remote content output (operation 604). In this mode, operations are performed by the television device to demodulate and decode the digital television content (operation 606), transcode the digital television content to a streamable format (operation 608), and then transmit the converted, transcoded digital television content to a media server (operation 610).

In an example the operations for casting the content (operation 604-610) may be performed while the television device is in a standby, low power, or other alternate operation mode. As a result, the television device tuner may operate to receive, convert, and transmit the content without providing a display output. The subsequent operations in the flowchart 600 depict providing a display output via the local television device with a display screen. It will be understood, however, that the display output may occur simultaneously or contemporaneously with the casting operations.

The operations in flowchart 600 for providing local display output on the television may be provided with use of a television output command received from an external device (operation 612), such a remote control, input button, CEC command, or the like. This output command may be sent directly to the television, from the media server, from an external service, or the like. In the local display output mode, the television device operates to activate the display of the digital content on the television device (operation 614), such as to process the demodulated and decoded digital content, and output the digital television content to a display screen of the television device (operation 616). In some examples, the operations 612, 614, and 616 are optional, such as in a scenario where the television casts the content while in a low-powered, standby, screensaver, or other mode where the display content is not simultaneously displayed on a screen.

Figure 7:
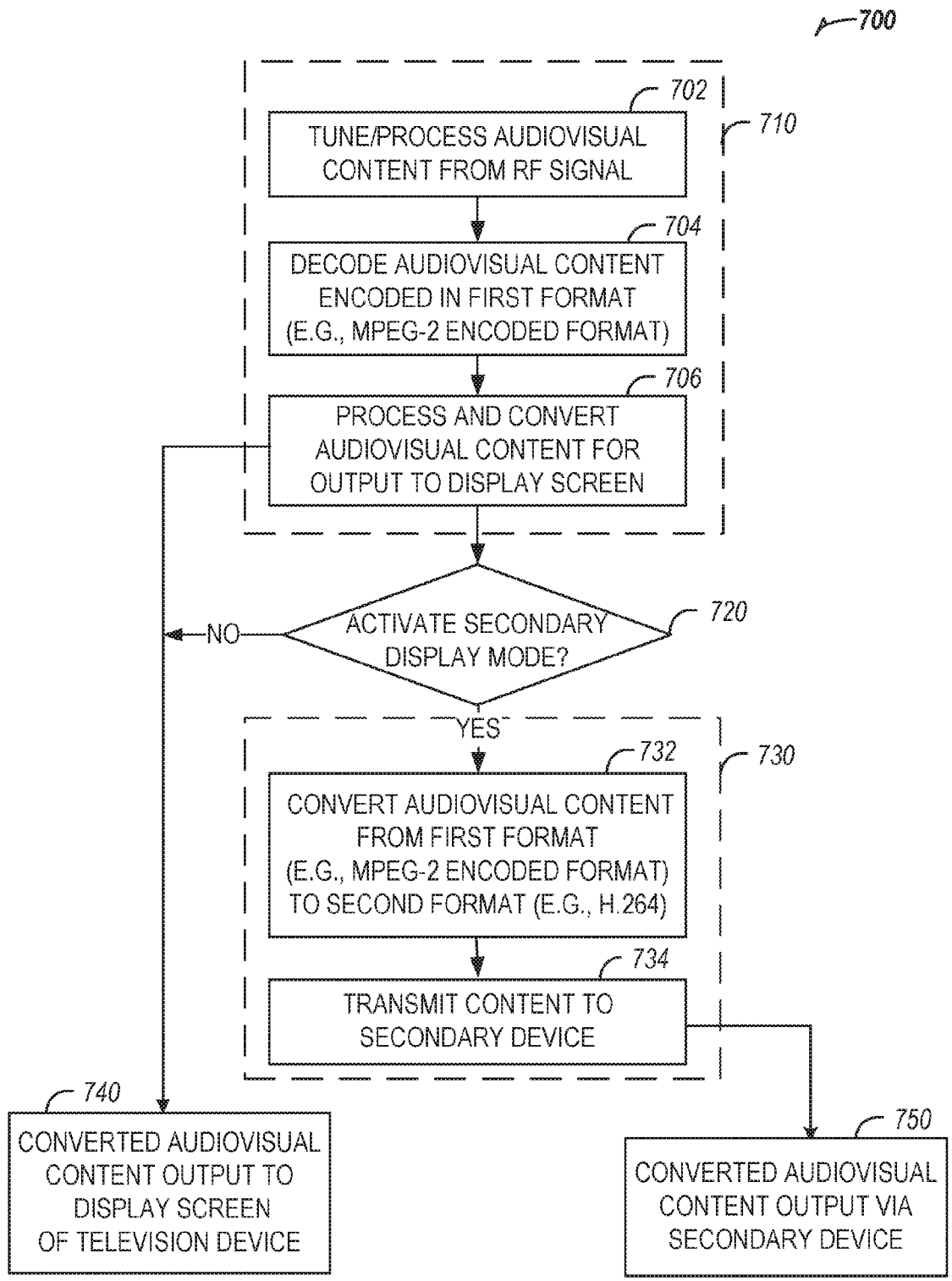
FIG. 7 illustrates a flowchart of a method performed by circuitry of a display device for concurrently outputting and casting audiovisual content, in connection with an example further described herein.

FIG. 7 provides an illustration of a flowchart 700 of a method performed by circuitry of a display device for concurrently outputting and casting audiovisual content to a television device and a secondary device, according to an example. The flowchart 700 thus provides a summary of the operations previously referenced in flowcharts 500 and 600, but with operations segmented among the primary display device (e.g., the television device including a tuner) and the secondary device (e.g., a mobile device receiving tuned audiovisual content).

As shown, the display operations (operation set 710) performed with the primary display device include operations to tune and process audiovisual content from an RF signal (operation 702), decode the audiovisual content from a first encoded format (operation 704), and process and convert the audiovisual content for output on a display screen (operation 706). These operations may be performed based on the sequence and device configuration described above with reference to FIGS. 2 and 3. As a result of the output to the display screen, the converted audiovisual content may be output to the display screen of the primary display device (operation 740).

In response to the activation of a secondary display mode on the primary display device (decision 720), casting operations (operation set 730) may be performed by the primary display device. The casting operations may include operations to convert (e.g., transcode) the audiovisual content from a first format (e.g., the native format received in the television from the tuned content, such as MPEP-2) to a second format (e.g., a streamable format, such as H.264) that can be casted over a network (operation 732). This content is then transmitted to the secondary display device (operation 734) such as via a Wi-Fi connection as discussed herein. As a result of the transmission to the secondary display device, the converted audiovisual content may be output on the display screen of the secondary display device (operation 750).

In an example, the display device may display the content (operation 740) and cast the digital video and digital audio concurrently or substantially simultaneously via a network connection (operation 750). In another example, the signal tuner device may transmit the tuned video concurrently or substantially simultaneously to multiple remote display devices or multiple local display devices, media servers, or any combination of remote display devices and local display devices.

The operations exemplified in FIGS. 5, 6, and 7 may be performed in any order and may be combined with other operations not shown. Further, the operations exemplified in FIGS. 5, 6, and 7 may be performed among multiple processing units, hardware modules, or devices.

Figure 8:
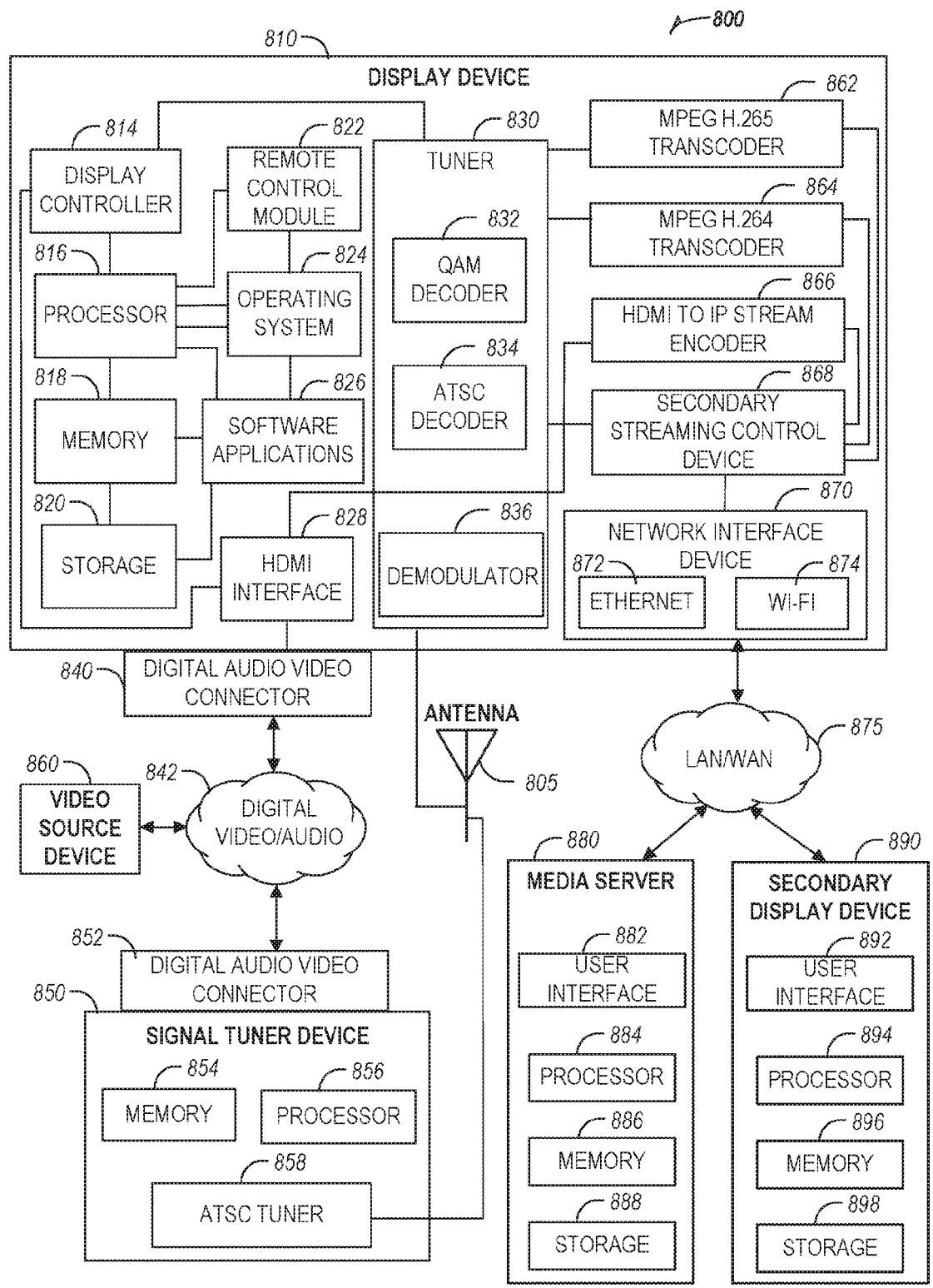
FIG. 8 illustrates a configuration of a display device operating in an electronic content system in accordance with an example further described herein.

FIG. 8 provides an illustration of a block diagram 800 for an example architecture of a system including a display device 810, configured for implementing the example techniques described herein. In some examples, the display device 810 may include an output display screen (not shown) such as a liquid crystal display (LCD), light-emitting diode (LED) display, organic light-emitting diode (OLED) display, cathode ray tube display, plasma display panel, or digital light processing (DLP) display, to directly provide content output. In some examples, the display device 810 may include functionality to directly receive user input with use of the output screen, such as with use of a touch screen input mechanism, or the display device 810 may receive user input in connection with other input processing components such as a video camera and video processing system configured to perform gesture-based detection and movement. Other features of televisions, display monitors, projectors, or display output devices may be included within display device 810.

The display and casting operations of the display device 810 may be implemented through use of a display controller 814, processor 816, memory 818, and storage component 820. The processor 816 may be operably coupled to the display controller 814, the memory 818, and the storage component 820, to facilitate operations of an operating system 824, one or more software application(s) 826, features of a graphical user interface, and the like. For example, instructions for execution of the operating system 824 and the software application(s) 826 may be provided in the storage component 820, loaded into the memory 818, and executed by the processor 816. In an example, the display controller 814, the processor 816, the memory 818, and other functional components are arranged in an SoC for the display device, or are arranged as part of a special-purpose circuitry for the display device 810 (e.g., in a motherboard or daughterboard configuration).

The software applications 826 may include over-the-top modules configured to receive over-the-top content, such as internet streaming video services, internet radio, or the like. For example, the software applications 826 may include an internet video module configured to display streaming video, such as Netflix, YouTube, Hulu, or the like. In another example, the software applications 826 may include other software modules configured to provide applications (apps) to a user.

The operating system 824 may provide various functions and features to facilitate operation of the television on-screen display and the various software application(s) 826, including the interface and applications to implement the input or output mechanisms, and on-screen display configurations described herein. The operating system 824, and software application(s) 826, and any associated graphical user interfaces may be configured for upgrading through either a local connection and commands (e.g., a universal serial bus (USB) port) or a remote connection and commands (e.g., an internet service) to obtain and deploy upgraded software.

As shown, the display device 810 is coupled to an antenna 805 or other source of digital television content, accessed through a signal processing component such as a tuner 830. The display device 810 may also receive content using a network interface device 870, to establish a connection to receive content from via a local area network or wide area network (LAN/WAN) 875 (e.g., via the internet) to output with the software applications 826. The display device 810 may also receive content using a digital audio video connector 840 (e.g., an HDMI connector) coupled to an HDMI interface 828 or another digital interface (e.g., a camera connected to a USB interface).

The display device 810 may further to receive interaction with a remote or other user input control via infrared (IR), radio frequency (RF), Wi-Fi (e.g., IEEE 802.11 standard), or similar wireless communication using the remote control module 822 and provide control of device operations through use of the processor 816, the memory 818, and the storage 820, for control of the display device 810. In an example, the remote control module 822 may communicate with a remote control device (not shown), and such remote control device may include a transceiver for transmitting or receiving signals for communication with the display device 810, such as the communication of IR, RF, Wi-Fi commands. The remote control device may also include buttons, a user interface, a display device, or the like for receiving commands from a user, used to communicate and provide commands to the display device for control of the casting and display output features described herein.

The tuner 830 includes features for receiving and processing digital television content. For example, this may be digital terrestrial television content that is received from an RF connection to an antenna 805, to provide a digital television signal that is processed by the demodulator 836, and decoded with an ATSC decoder 834. In other examples, the tuner 830 may receive a digital cable television content that is received with an RF connection to a cable network, and use a QAM decoder 832 to decode the digital cable signal. The tuner 830 or the demodulator 836 may include a filter, such as a radio frequency filter or a filter to convert a signal to an intermediate frequency, a baseband frequency, or the like.

In an example, the demodulator 836 may demodulate a tuned digital bitstream or the digital terrestrial, cable, or satellite television signal. The demodulation may include separating a video component and an audio component. Frequency modulation or manipulation may also be done for the video component or the audio component or both together. The demodulator 836 may decompress a video or audio component. In another example, the tuner 830 may include an analog to digital converter or a digital to analog converter for converting the digital terrestrial, cable, or satellite television signal, the bitstream, or any other data from an analog signal to a digital signal or from a digital signal to an analog signal. The tuner 830 may include multiple analog to digital converters or multiple digital to analog converters to manipulate multiple data signals or manipulate data signals at different times. Other components of the display device 810 may also include one or more analog to digital converters or one or more digital to analog converters.

Tuner functions may be provided via a tuner that is located external to the display device. This may be provided from an external signal tuner device 850, which may be operably coupled to the display device 810 via a digital audio video connector 852 connected via the audio video connector 840. This connection is used to communicate the digital audio/video 842 (e.g., decoded audio/video) from the signal tuner device 850 such as tuned with the ATSC tuner 858 (e.g., a silicon tuner) and any processor 856 and memory 854 of the tuner device. Also in a further example, using the digital audio video connector 840, the display device 810 may send commands using device control (e.g., CEC/RCP) communication to interact with the signal tuner device 850, such as to control the signal tuner device 850 or the ATSC tuner 858 via a device control (e.g., CEC/RCP) command using the device control communication.

The display device 810 may receive digital video/audio content 842 from a digital video source device 860 via its digital audio video connector 840, which is in turn received by the HDMI interface 828. For example, a blue-ray player, external set-top box, media player, gaming console, camera (e.g., gaming console camera, security camera, webcam) or the like may operate as the digital video source device 860. In some examples, the content may be encrypted or encoded (such as with High-Bandwidth Digital Content Protection (HDCP)) and subject to further processing (including decryption and decoding) by the display device 810.

The display device 810 may receive a command using the remote control module 822 and convert the command to a device control (e.g., CEC/RCP) command and use that device control command to control any of the components of the tuner 830. In other examples, the display device may include an integrated antenna or antenna port (Not shown) for receiving or tuning other forms of digital terrestrial, cable, or satellite television signals.

A digital bitstream, transport stream, or other formats of digital video and digital audio may be provided from the tuner 830 (or from the signal tuner device 850). The digital bitstream or digital video and digital audio may include encoded, decoded, or unencoded audio visual content, an audio video transport stream, or the like. In an example, the tuner 830 is coupled to one or more transcoders or encoders, such as a MPEG H.265 transcoder 862, and MPEG H.264 transcoder 864, an HDMI stream encoder 866, or other coding functions. The transcoders may include functions of an encoder, a decoder, or the like. For examples, the transcoders may decompress a video or audio compression format, receive an input of a digital video and digital audio in a first format, and output digital video and digital audio in a second format. The transcoders may an input of a digital video and digital audio content from a terrestrial, cable, or satellite television signal and, using one or more of the transcoders, output another video or audio format for streaming over Wi-Fi or via a LAN to a remote display device, such as a smartphone, tablet, or laptop.

In further examples, features of the display device 810 may be included within an SoC or hardware modules. For example, functions of the tuner 830 and the transcoders 862, 864, 866 may be integrated into another SoC that duplicates one or more components of the display device 810. Features of the transcoders and encoders may also be consolidate or integrated as part of a SoC, a motherboard, a daughterboard, or other portions of the internal circuitry of the display device 810.

The network interface device 870 is depicted as including an Ethernet adapter 872 and a wireless network adapter 874. The wireless network adapter may communicate with any number of wireless mediums, including Bluetooth, IEEE 802.11 a/b/g/n/ac/ax (Wi-Fi), 3GPP Long Term Evolution/Long Term Evolution-Advanced (LTE/LTE-A), IEEE 802.16 (WiMAX), Wi-Fi Direct, Wireless Home Digital Interface (WHDI), Digital Living Network Alliance (DLNA), Digital Audio Access Protocol (DAAP), Universal Plug and Play (UPnP), infrared (IR), radio frequency (RF), or the like communications which may be defined according to respective standards families and standards groups.

The media server 880 may include a processor 884, a memory 886, and a storage 888, to perform the media hosting and serving functions described herein. The processor 884, the memory 886, and the storage 888 may further provide a user interface 882 (provided from features of an operating system, software applications, and the like). The media server 880 may further include communication hardware (not shown) to connect to the display device 810 via the LAN/WAN 875 to receive and transmit the casted content.

The secondary display device 890 may include a processor 894, memory 896, and a storage 898, to perform the casting playback functions described herein. The processor 894, the memory 896, and the storage 898 may further provide a user interface 892 (provided from features of an operating system, software applications, and the like) to provide the casting playback functions on a display screen (not shown) of the secondary display device 890. The secondary display device 890 may further include communication hardware (not shown) to connect to the display device 810 via the LAN/WAN 875, to receive the casted content.

Embodiments of the techniques and configurations may be implemented within a variety of systems and display devices, including televisions, monitors, projectors, tablets, portable computers, wearables, and other video display screens, in addition to display devices without a screen or other direct video output. Other devices which stream audiovisual signals may also be used in connection with the features described herein. As used herein, audiovisual content refers generally to content including both audio and visual characteristics, as well as content providing exclusively audio characteristics or exclusively visual characteristics.

Embodiments may be implemented in connection with wired and wireless networks, across a variety of digital and mediums. These techniques and configurations may also be applicable to display of content from wired and wireless digital sources from a variety of local area wireless multimedia networks and network content accesses using WLANs, WWANs, and wireless communication standards. Further, the previously described techniques and configurations are not limited to input sources provided from a direct analog or digital over-the-air television signal, but may be applied used with any number of multimedia streaming applications and protocols to process and cast audiovisual display content.

Also, although many of the previous examples were provided with reference to the decoding of ATSC signals (such as over-the-air ATSC signals used in North America), it will be understood that such decoding operations may also occur with use of other global terrestrial television standards, such as DVB-T/DVB-T2, ISDB-T, DTMB, DMB, and the like. Further, other digital and analog cable, satellite signal, and network streaming formats may also be used with the presently disclosed configurations.

As suggested in the prior examples, the present techniques may be implemented with use of an external tuner device, such as through a tuner "stick" or through an external set top box configured for operation with the television device. An example of a tuner device is found in U.S. patent application Ser. No. 14/519,997 to Majid, titled "MULTISTREAM TUNER STICK DEVICE FOR RECEIVING AND STREAMING DIGITAL CONTENT", which is incorporated herein by reference in its entirety.

Thus, it will be understood that the presently described embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer or other processor-driven display device). For example, a machine-readable storage device may include read-only memory (ROM), random-access memory (RAM), magnetic disk storage media, optical storage media, flash-memory devices, and other storage devices and media. In some embodiments, display devices such as televisions, A/V receivers, set-top boxes, and media players may include one or more processors and may be configured with instructions stored on such machine-readable storage devices.

VARIOUS NOTES & EXAMPLES

Additional examples of the presently described method, system, and device embodiments are suggested according to the structures and techniques described herein. Other non-limiting examples may be configured to operate separately, or may be combined in any permutation or combination with any one or more of the other examples provided above or throughout the present disclosure.

Example 1 is a display device, comprising: a display screen; and circuitry, including: a tuner to receive a digital terrestrial television signal and produce an audiovisual content in a first format; a display controller to receive the audiovisual content from the tuner and process the audiovisual content for output on the display screen; a transcoder to receive the audiovisual content from the tuner and convert the audiovisual content from the first format to a second format; and a network interface device to transmit the audiovisual content in the second format to a remote device via a network connection; and wherein the display screen is coupled to the display controller, and wherein the display screen outputs the audiovisual content received from the display controller.

In Example 2, the subject matter of Example 1 optionally includes wherein the circuitry is included on a motherboard or daughterboard located inside the display device, and wherein the output to the display screen and the output to the network interface device occurs simultaneously.

In Example 3, the subject matter of any one or more of Examples 1-2 optionally include wherein the display device is a television, wherein the digital terrestrial television signal is an Advanced Television Systems Committee (ATSC) digital terrestrial television signal, and wherein the audiovisual content in the first format includes video content in a MPEG-2 format and audio content in an AC-3 format.

In Example 4, the subject matter of any one or more of Examples 2-3 optionally include wherein the network interface device includes a wireless networking chipset, wherein the wireless networking chipset is configured to communicate in accordance with a network interface standard in compliance with the IEEE 802.11 standards family.

In Example 5, the subject matter of any one or more of Examples 2-4 optionally include wherein the network interface device includes a wired networking chipset, wherein the wired networking chipset is configured to communicate with the remote device via a local area or wide area network connection.

In Example 6, the subject matter of any one or more of Examples 1-5 optionally include wherein the transcoder includes: a transcoder to convert the audiovisual content to a MPEG H.265 video format and a transcoder to convert the audiovisual content to a MPEG H.264 video format.

In Example 7, the subject matter of any one or more of Examples 1-6 optionally include the circuitry further including a HDMI interface to receive digital audiovisual content in a third format from a connected device, wherein the transcoder includes a HDMI content encoder coupled to the HDMI interface, wherein content received in the third format from the connected device via the HDMI interface is encoded into the second format by the HDMI content encoder and transmitted to the remote device using the network interface device.

In Example 8, the subject matter of any one or more of Examples optionally include the circuitry further including a streaming control device, the streaming control device to control transmission of the audiovisual content in the second format to the remote device via the network interface device.

In Example 9, the subject matter of Example 8 optionally includes wherein the remote device is a media server, wherein the media server is to receive the audiovisual content in the second format and store the audiovisual content in the second format.

Example 10 is a method performed by circuitry of a display device, the method comprising: receiving audiovisual content from a source, wherein the audiovisual content is provided in a first format; processing the audiovisual content by a display controller of the display device for output on a display screen of the display device; outputting the audiovisual content from the display controller to the display screen of the display device; converting the audiovisual content from the first format to a second format; and transmitting, via a network connection established with a network interface device, the converted audiovisual content from the display device to a secondary device.

In Example 11, the subject matter of Example 10 optionally includes operating a tuner, the tuner to receive a digital terrestrial television signal and provide the audiovisual content in the first format by demodulating and decoding the digital terrestrial television signal.

In Example 12, the subject matter Example 11 optionally includes wherein the tuner is located external to the display device, and wherein the display device provides commands to the tuner to control the tuner.

In Example 13, the subject matter of any one or more of Examples 11-12 optionally include wherein the display device is a television, wherein the audiovisual content received from a source is an Advanced Television Systems Committee (ATSC) digital terrestrial television signal, and wherein the audiovisual content includes video content in a MPEG-2 format and audio content in an AC-3 format.

In Example 14, the subject matter of any one or more of Examples 10-13 optionally include wherein receiving the audiovisual content and processing the audiovisual content includes: receiving an audiovisual content signal from an MIMI input port; and decoding the audiovisual content from the audiovisual content signal received from the HDMI input port.

In Example 15, the subject matter of any one or more of Examples 10-14 optionally include wherein the network interface device includes a wireless networking chipset, and wherein the wireless networking chipset is configured to communicate in accordance with a network interface standard in compliance with the IEEE 802.11 standards family.

In Example 16, the subject matter of any one or more of Examples 10-15 optionally include wherein the converting transcodes the audiovisual content to a MPEG H.264 or a MPEG H.265 format.

In Example 17, the subject matter of any one or more of Examples 10-16 optionally include wherein the secondary device is a media server, the media server to store the converted audiovisual content for subsequent playback by a secondary device.

Example 18 is a system, comprising: a television signal tuner device, the television signal tuner device comprising a tuner to receive a digital terrestrial television signal and produce digital audiovisual content in a first format; and a display device, the display device comprising a display screen and circuitry, the circuitry including: a display controller to receive the digital audiovisual content and process the digital audiovisual content for output on the display screen; a transcoder to receive the digital audiovisual content and convert the digital audiovisual content from the first format to a second format; and a network interface device to transmit the digital audiovisual content in the second format to a remote device via a network connection: wherein the television signal tuner device is located external to the circuitry of the display device, and wherein the television signal tuner device is configured to receive a device control command from the display device to tune a digital television channel providing the digital audiovisual content.

In Example 19, the subject matter of Example 18 optionally includes wherein the display device is a display monitor without a tuner, wherein the digital terrestrial television signal is an Advanced Television Systems Committee (ATSC) digital terrestrial television signal, and wherein the digital audiovisual content includes video content in a MPEG-2 format and audio content in a AC-3 format.

In Example 20, the subject matter of Example 19 optionally includes an antenna to provide the digital terrestrial television signal to the television signal tuner device.

In Example 21, the subject matter of any one or more of Examples 18-20 optionally include wherein the television signal tuner device is coupled to a HDMI port of the display device via a HDMI digital audio video connector, the HDMI port coupled to the display controller to provide the digital audiovisual content.

In Example 22, the subject matter of any one or more of Examples 18-21 optionally include a media server, comprising: a processor; a memory; and a storage device to store the digital audiovisual content in the second format.

In Example 23, the subject matter of any one or more of Examples 18-22 optionally include a secondary display device, comprising: a processor; a memory; a display screen to display the digital audiovisual content in the second format; and a user interface output via the display screen to control the display of the digital audiovisual content in the second format.

Each of these non-limiting examples may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:
1. A display device, comprising:
a display screen; and
circuitry, including:
 a tuner to receive a digital terrestrial television signal and produce an audiovisual content in a first format;
 a display controller to receive the audiovisual content from the tuner and process the audiovisual content for output on the display screen;
 a transcoder to receive the audiovisual content from the tuner and convert the audiovisual content from the first format to a second format; and
 a network interface device to transmit the audiovisual content in the second format to remote device via a network connection;
 wherein the network interface device includes a wireless networking chipset, wherein the wireless networking chipset is configured to communicate in accordance with a network interface standard in compliance with the IEEE 802.11 standards family; and wherein the display screen is coupled to the display controller, and wherein the display screen outputs the audiovisual content received from the display controller.

2. The display device of claim 1, wherein the circuitry is included on a motherboard or daughterboard located inside the display device, and wherein the output to the display screen and the output to the network interface device occurs simultaneously.

3. The display device of claim 1, wherein the display device is a television, wherein the digital terrestrial television signal is an Advanced Television Systems Committee (ATSC) digital terrestrial television signal, and wherein the audiovisual content in the first format includes video content in a MPEG-2 format and audio content in an AC-3 format.

4. The display device of claim 1, wherein the network interface device includes a wired networking chipset, wherein the wired networking chipset is configured to communicate with the remote device via a local area or wide area network connection.

5. The display device of claim 1, wherein the transcoder includes:
a transcoder to convert the audiovisual content to a MPEG H.265 video format, and a transcoder to convert the audiovisual content to a MPEG H.264 video format.

6. The display device of claim 1, the circuitry further including a HDMI interface to receive digital audiovisual content in a third format from a connected device, wherein the transcoder includes a HDMI content encoder coupled to the HDMI interface, wherein content received in the third format from the connected device via the HDMI interface is encoded into the second format by the HDMI content encoder and transmitted to the remote device using the network interface device.

7. The display device of claim 1, the circuitry further including a streaming control device, the streaming control device to control transmission of the audiovisual content in the second format to the remote device via the network interface device.

8. The display device of claim 7, wherein the remote device is a media server, wherein the media server is to receive the audiovisual content in the second format and store the audiovisual content in the second format.

9. A method performed by circuitry of a display device, the method comprising:
receiving audiovisual content from a source, wherein the audiovisual content is provided in a first format;
processing the audiovisual content by a display controller of the display device for output on a display screen of the display device;
outputting the audiovisual content from the display controller to the display screen of the display device;
converting the audiovisual content from the first format to a second format;
transmitting, via a network connection established with a network interface device, the converted audiovisual content from the display device to a secondary device; and
wherein the network interface device includes a wireless networking chipset, and wherein the wireless networking chipset is configured to communicate in accordance with a network interface standard in compliance with the IEEE 802.11 standards family.

10. The method of claim 9, further comprising:
operating a tuner, the tuner to receive a digital terrestrial television signal and provide the audiovisual content in the first format by demodulating and decoding the digital terrestrial television signal.

11. The method of claim 10, wherein the tuner is located external to the display device, and wherein the display device provides commands to the tuner to control the tuner.

12. The method of claim 10, wherein the display device is a television, wherein the audiovisual content received from a source is an Advanced Television Systems Committee (ATSC) digital terrestrial television signal, and wherein the audiovisual content includes video content in a MPEG-2 format and audio content in an AC-3 format.

13. The method of claim 9, wherein receiving the audiovisual content and processing the audiovisual content includes:
receiving an audiovisual content signal from an HIM input port; and
decoding the audiovisual content from the audiovisual content signal received from the HUM input port.

14. The method of claim 9, wherein the converting transcodes the audiovisual content to a MPEG H.264 or a MPEG H.265 format.

15. The method of claim 9, wherein the secondary device is a media server, the media server to store the converted audiovisual content for subsequent playback by a secondary display device.

16. A system, comprising:
a television signal tuner device, the television signal tuner device comprising a tuner to receive a digital terrestrial television signal and produce digital audiovisual content in a first format; and
a display device, the display device comprising a display screen and circuitry, the circuitry including:
a display controller to receive the digital audiovisual content and process the digital audiovisual content for output on the display screen;
a transcoder to receive the digital audiovisual content and convert the digital audiovisual content from the first format to a second format; and
a network interface device to transmit the digital audiovisual content in the second format to a remote device via a network connection;
wherein the television signal tuner device is located external to the circuitry of the display device, and wherein the television signal tuner device is configured to receive a device control command from the display device to tune a digital television channel providing the digital audiovisual content.

17. The system of claim 16, wherein the display device is a display monitor without a tuner, wherein the digital terrestrial television signal is an Advanced Television Systems Committee (ATSC) digital terrestrial television signal, and wherein the digital audiovisual content includes video content in a MPEG-2 format and audio content in a AC-3 format.

18. The system of claim 17, further comprising:
an antenna to provide the digital terrestrial television signal to the television signal tuner device.

19. The system of claim 16, wherein the television signal tuner device is coupled to a HDMI port of the display device via a HDMI digital audio video connector, the HDMI port coupled to the display controller to provide the digital audiovisual content.

20. The system of claim 16, further comprising:
a media server, comprising:
- a processor;
- a memory; and
- a storage device to store the digital audiovisual content in the second format.

21. The system of claim 16, further comprising:
a secondary display device, comprising:
- a processor;
- a memory;
- a display screen to display the digital audiovisual content in the second format; and
- a user interface output via the display screen to control the display of the digital audiovisual content in the second format.

22. A display device, comprising:
a display screen; and
circuitry, including:
- a tuner to receive a digital terrestrial television signal and produce an audiovisual content in a first format;
- a display controller to receive the audiovisual content from the tuner and process the audiovisual content for output on the display screen;
- a transcoder to receive the audiovisual content from the tuner and convert the audiovisual content from the first format to a second format; and
- a network interface device to transmit the audiovisual content in the second format to a remote device via a network connection;

wherein the display screen is coupled to the display controller, and wherein the display screen outputs the audiovisual content received from the display controller;

wherein the circuitry is included on a motherboard or daughterboard located ins display device; and wherein the output to the display screen and the output to the network interface device occurs simultaneously.

* * * * *

UNITED STATES PATENT AND TRADEMARK OFFICE
CERTIFICATE OF CORRECTION

PATENT NO. : 9,681,183 B1
APPLICATION NO. : 15/159742
DATED : June 13, 2017
INVENTOR(S) : Mahmood Majid Page 1 of 1

It is certified that error appears in the above-identified patent and that said Letters Patent is hereby corrected as shown below:

On the Title Page

On page 2, in Column 1, under "Other Publications", Line 6, delete "auide" and insert --guide-- therefor In the Claims In Column 18, Line 63, in Claim 1, delete "to" and insert --to a-- therefor In Column 20, Line 19, in Claim 13, delete "HIM" and insert --HDMI-- therefor In Column 20, Line 22, in Claim 13, delete "HUM" and insert --HDMI-- therefor In Column 22, Line 15, in Claim 22, delete "ins" and insert --inside the-- therefor Signed and Sealed this
Tenth Day of April, 2018

Andrei Iancu
*Director of the United States Patent and Trademark Office*